(12) United States Patent
Akiyoshi et al.

(10) Patent No.: US 7,636,172 B2
(45) Date of Patent: Dec. 22, 2009

(54) IMAGE FORMING APPARATUS, INFORMATION PROCESSING APPARATUS AND VERSION CHECK METHOD USING AN API FROM AN APPLICATION

(75) Inventors: Kunihiro Akiyoshi, Fukuoka (JP); Mitsuo Ando, Fukuoka (JP); Hiroyuki Tanaka, Fukuoka (JP)

(73) Assignee: Ricoh Company, Ltd., Tokyo (JP)

( * ) Notice: Subject to any disclaimer, the term of this patent is extended or adjusted under 35 U.S.C. 154(b) by 994 days.

(21) Appl. No.: 10/627,731

(22) Filed: Jul. 28, 2003

(65) Prior Publication Data

US 2004/0075857 A1 Apr. 22, 2004

(30) Foreign Application Priority Data

Jul. 31, 2002 (JP) ............................. 2002-224136
Jul. 10, 2003 (JP) ............................. 2003-195193
Jul. 10, 2003 (JP) ............................. 2003-195194

(51) Int. Cl.
*G06F 3/12* (2006.01)
*G06F 9/46* (2006.01)

(52) U.S. Cl. ...................................... 358/1.13; 358/1.1

(58) Field of Classification Search .................. 358/1.1, 358/1.9, 1.13, 1.14, 1.15, 474, 400, 448
See application file for complete search history.

(56) References Cited

U.S. PATENT DOCUMENTS

| | | | |
|---|---|---|---|
| 5,613,101 A | 3/1997 | Lillich | |
| 5,668,999 A | 9/1997 | Gosling | |
| 5,774,720 A | 6/1998 | Borgendale et al. | |
| 5,926,636 A | 7/1999 | Lam et al. | |
| 6,023,727 A | 2/2000 | Barrett et al. | |
| 6,986,132 B1 * | 1/2006 | Schwabe | 717/168 |
| 2002/0080398 A1 | 6/2002 | Matsushima | 358/1.16 |
| 2003/0058471 A1 * | 3/2003 | Okubo | 358/1.16 |

FOREIGN PATENT DOCUMENTS

| | | |
|---|---|---|
| DE | 199 26 467 C1 | 1/2001 |
| JP | 2002-82806 | 3/2002 |
| JP | 2002-200827 | 7/2002 |
| WO | WO 02/23331 | 3/2002 |

OTHER PUBLICATIONS

U.S. Appl. No. 10/798,437, filed Mar. 12, 2004, Tanaka et al.

(Continued)

*Primary Examiner*—Gabriel I Garcia
(74) *Attorney, Agent, or Firm*—Oblon, Spivak, McClelland, Maier & Neustadt, L.L.P.

(57) ABSTRACT

An image forming apparatus is provided, in which the image forming apparatus includes an application for performing processes on image forming, and a system service for performing processes of a system side on the basis of a request by using an API from the application. The image forming apparatus further includes: a part for obtaining version information of APIs used by the application for the system service, and version information of APIs of the system service; and a part for comparing, API by API, versions of the APIs used by the application with versions of the APIs of the system service.

18 Claims, 13 Drawing Sheets

OTHER PUBLICATIONS

U.S. Appl. No. 10/807,323, filed Mar. 24, 2004, Ando.
U.S. Appl. No. 10/900,098, filed Jul. 28, 2004, Ohishi et al.
Anonymous: "Implicit Version Control for ODBC/CLI Application", Research Disclosure, No. 449, XP-002312112, Article No. 449165, Sep. 1, 2001, 4 pages.
U.S. Appl. No. 11/216,013, filed Sep. 1, 2005, Ando et al.
U.S. Appl. No. 11/250,405, filed Oct. 17, 2005, Shimizu.
U.S. Appl. No. 11/502,516, filed Aug. 11, 2006, Tanaka.
U.S. Appl. No. 11/509,601, filed Aug. 25, 2006, Ando et al.
U.S. Appl. No. 11/521,495, filed Sep. 15, 2006, Ando.
U.S. Appl. No. 11/521,567, filed Sep. 15, 2006, Ando.
U.S. Appl. No. 10/274,882, filed Oct. 22, 2002, Akiyoshi.
Winton, Greg (tranlsation by Murai, Susumu) "Extending the PalmOS", Trans Tech, Japan, Shoeisha Co. Ltd., Jan. 1, 2000, vol. 9, No. 20, p. 121-126.

* cited by examiner

FIG.6

```
int main(int argc, char** argv)
{
    if(argc==2) {
        if(strcmp(argv[1], "-v")==0)
            //EXECUTE TENTATIVE LAUNCH
            if(ConnectVAS()==OK){    //PREPARE COMMUNICATION WITH VAS
                SetApliInfo();        //PROVIDING APPLICATION INFORMATION
                Close                 //END OF COMMUNICATION
            }
            exit(1)
        }
    }
    NORMAL LAUNCH PROCESSING
}
```

| NCS | Ver. 1.2 |
| FCS | Ver. 2.5 |
| VAS | Ver. 3.0 |

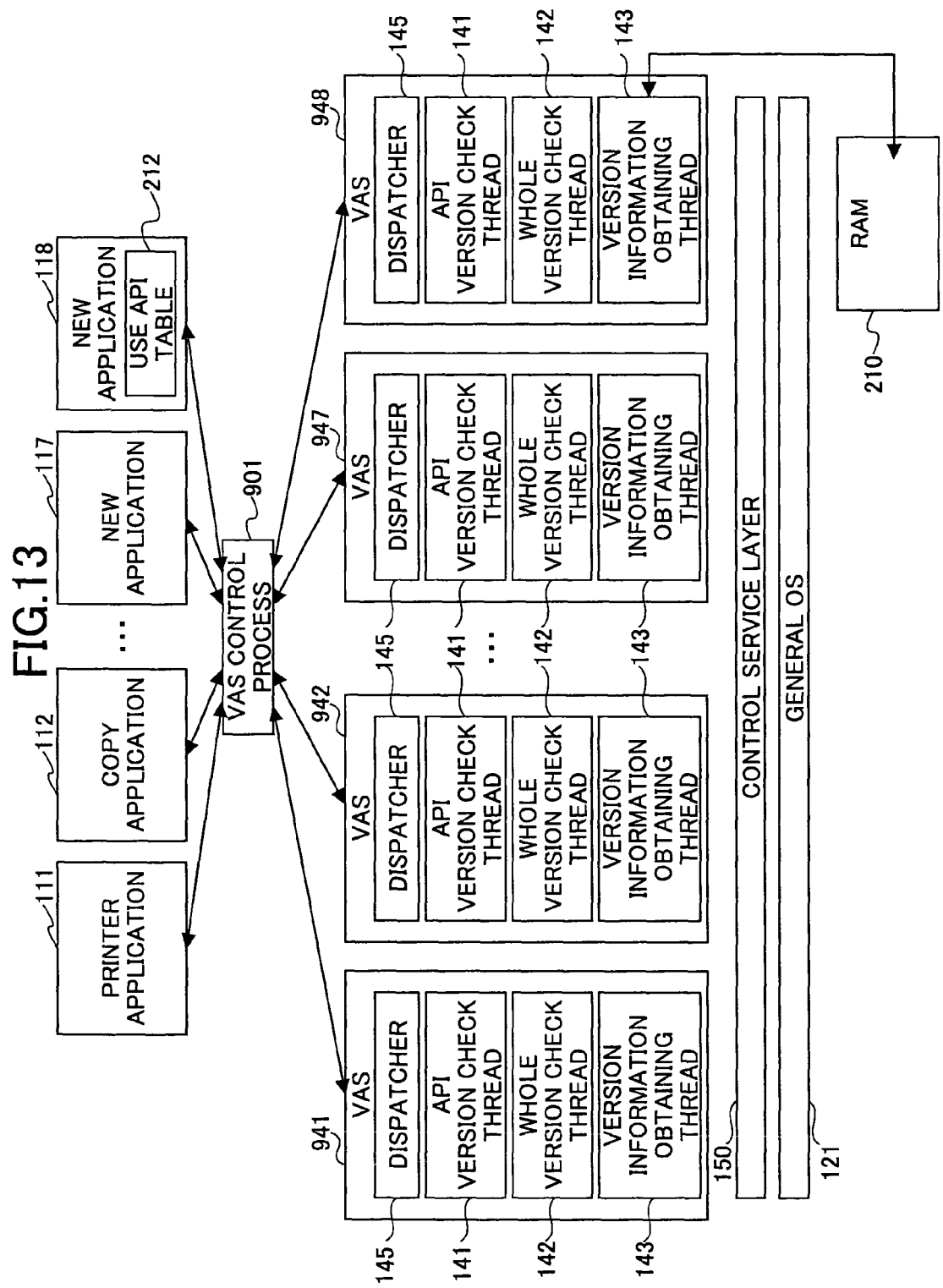

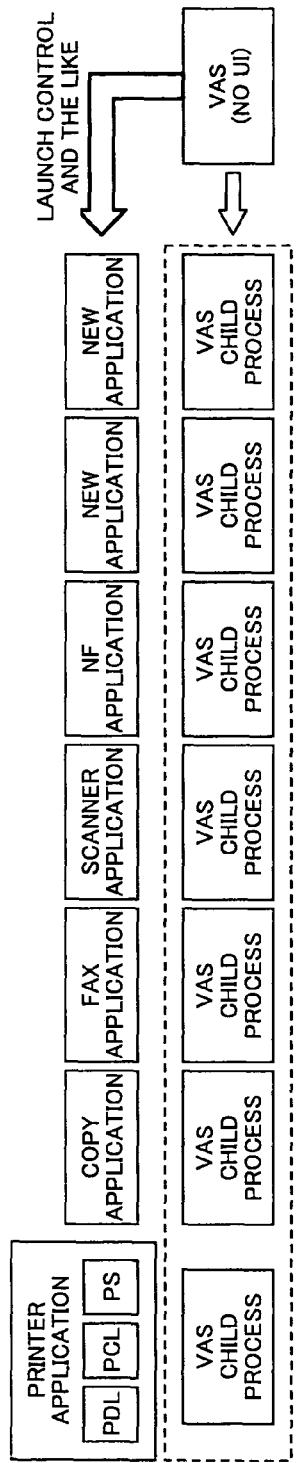
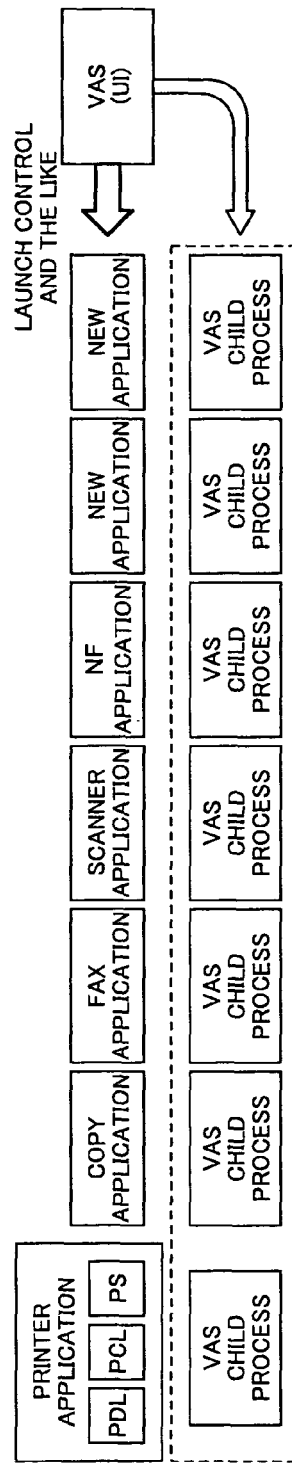
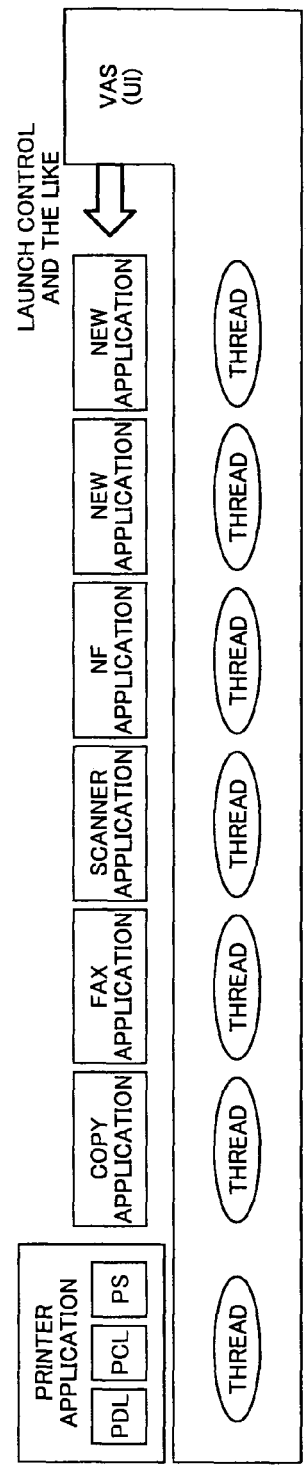
FIG.14A
FIG.14B
FIG.14C

IMAGE FORMING APPARATUS, INFORMATION PROCESSING APPARATUS AND VERSION CHECK METHOD USING AN API FROM AN APPLICATION

BACKGROUND OF THE INVENTION

1. Field of the Invention

The present invention relates to technology for preventing problems from occurring due to version mismatch between an application and a system service executed on an image forming apparatus or an information processing apparatus.

2. Description of the Related Art

Recently, an example of an information processing apparatus, an image forming apparatus (to be referred to as a compound machine hereinafter) that includes functions of a printer, a copier, a facsimile, a scanner and the like in a cabinet is generally known. The compound machine includes a display part, a printing part and an image pickup part and the like in a cabinet. In the compound machine, three pieces of software corresponding to the printer, copier and facsimile respectively are provided, so that the compound machine functions as the printer, the copier, the scanner and the facsimile respectively by switching the software.

According to such a conventional compound machine, an application program is launched for each function unit such as printer, copier, facsimile and scanner, and each application program has a function to access hardware resources. At that time, it is assumed that a version of an operating system (OS) on which the application program based and a version of OS actually used in the compound machine are the same. However, for example, if the OS is upgraded so that the versions between the OSes are different, there may be a case where a function that has been used so far by the application becomes unusable, or the application itself may become unusable.

Thus, according to the conventional compound machine, if the OS is upgraded in the compound machine, it is required to recompiling the application such that the application operates on the upgraded OS.

Since the conventional compound machine is provided with each software for the printer, the copier, the scanner and the facsimile individually, much time is required for developing the software. Therefore, the applicant has developed an image forming apparatus (compound machine) including hardware resources, a plurality of applications, and a platform including various control services provided between the applications and the hardware resources. The hardware resources are used for image forming processes for a display part, a printing part and an image pickup part. The applications perform processes intrinsic for user services of printer, copier and facsimile and the like. The platform includes various control services performing management of hardware resources necessary for at least two applications commonly, performing execution control of the applications, and image forming processes, when a user service is executed.

According to such a new compound machine, the applications and the control services are provided separately. Thus, after the compound machine is shipped, users or third party venders can develop new applications to install on the compound machine. By doing so, various functions can be provided.

Since the new compound machine is provided with control services, separately from applications, for providing services commonly required by at least two applications, it is necessary to write source code for interprocess communication between the application and the various control services when developing an application.

When developing a new application, it is necessary to precisely grasp application program interfaces (API: including functions and events) provided by each control service and to write the source code according to a predetermined procedure. However, if upgrade of APIs is repeated due to debugging and addition of functions and the like, it becomes difficult for a vendor to develop applications since it is not clear which API version the application should comply with. Thus, there is a possibility that a version of an API used by the developed application for a control service is difference from a version of the API of the control service actually used in the compound machine. If this application is executed on the compound machine, an error may occur and the application may affect the combined machine.

This problem is a new problem that was not a problem for the conventional compound machine. In addition to the control service, if a module that provide services to applications via APIs is adopted, the same problem will arise. In addition, this problem is common to a general information processing apparatus (for example, general computer) in which an application is executed on a system software.

SUMMARY OF THE INVENTION

An object of the present invention is to provide an image forming apparatus, an information processing apparatus and a method for checking version differences between APIs provided by the system side such as the control services and APIs used by the application.

The above object can be achieved by an image forming apparatus including an application for performing processes on image forming, and a system service for performing processes of a system side of the image forming apparatus on the basis of a request by using an API from the application, the image forming apparatus including:

an obtaining part for obtaining version information of APIs used by the application for the system service, and version information of APIs of the system service;

a comparing part for comparing, API by API, versions of the APIs used by the application with versions of the APIs of the system service.

According to the present invention, the obtaining part obtains version information of APIs used by the application and version information of APIs provided by the system service, so that the comparing part checks, API by API, whether versions of corresponding APIs are the same. Therefore, if an API that is not used in the application is changed, added or deleted so that a version of the set of the APIs of system is changed, it can determine that the application and the system service are consistent with each other as for the versions of APIs.

The above-object is also achieved by an information processing apparatus including an application, and a system service for performing processes of a system side of the information processing apparatus on the basis of a request by using an API from the application, the information processing apparatus including:

an obtaining part for obtaining version information of APIs used by the application for the system service, and version information of APIs of the system service;

a comparing part for comparing, API by API, versions of the APIs used by the application with versions of the APIs of the system service.

BRIEF DESCRIPTION OF THE DRAWINGS

Other objects, features and advantages of the present invention will become more apparent from the following detailed description when read in conjunction with the accompanying drawings, in which:

FIG. 6 shows an example of a program description (main function) of an application including the tentative launch function according to the first embodiment;

FIG. 13 is a figure showing a configuration of the VAS 941-948 of the compound machine 900 of the second embodiment, and relationship among the VAS 941-948, each application, control service layer 150 and general OS 121;

FIGS. 14A-14C show examples of configurations of VASes.

DETAILED DESCRIPTION OF THE PREFERRED EMBODIMENTS

In the following, the image forming apparatus according to embodiments of the present invention will be described. The image forming apparatus is an example of information processing apparatuses.

First Embodiment

Figure 1:
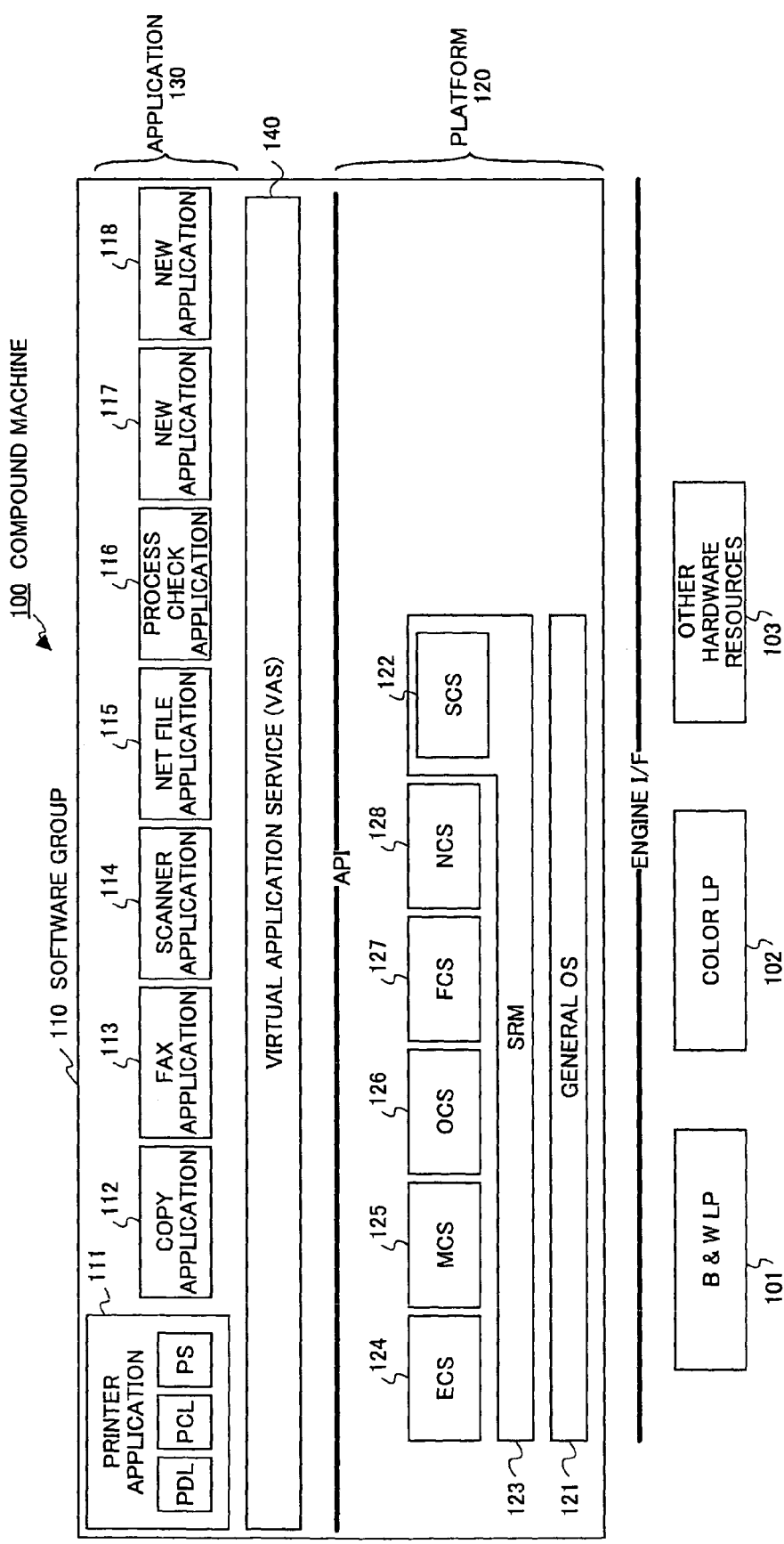
FIG. 1 is a block diagram of an image forming apparatus according to a first embodiment of the present invention.

FIG. 1 is a block diagram of an image forming apparatus (to be referred to as a compound machine hereinafter) according to the first embodiment of the present invention. As shown in FIG. 1, the compound machine 100 includes hardware resources and a software group 110. The hardware resources include a black and white line printer (B&W LP) 101, a color laser printer 102, and hardware resources 103 such as a scanner, a facsimile, a hard disk, memory (RAM, NV-RAM, ROM and the like) and a network interface. The software group 110 includes a platform 120, applications 130 and a virtual application service 140 (to be referred to as VAS hereinafter).

The VAS 140 is provided between the applications 130 and the platform 120. The VAS 140 is registered at the same time when each application is registered at the first time. The VAS 140 is recognized as a service layer in the platform 120 from the application's point of view, and is recognized as an application from the service layer's point of view. That is, the VAS140 operates as a client process of a control service that is a server, and operates as a server process of an application that is a client.

As a basic function of the VAS 140, the VAS 140 has wrapping function. According to this wrapping function, the VAS 140 absorbs version differences between the applications and the platform 120, and purposefully hides the platform 120 by selecting messages from the control services. In addition, the VAS 140 hides APIs of the control services that should be hidden against the applications 130, and the VAS 140 discloses predetermined APIs to the applications 130, so that security of important APIs can be kept.

However, since VAS 140 may be upgraded to comply with upgraded control services, a version mismatch may occur between an application and the VAS 140 even though the VAS 140 has the wrapping function to absorb version differences. In such a case, errors may occur at the time of execution of the application.

Thus, to suppress an error at the time of execution of the application, the VAS 140 has a function to compare a whole version of an application and a whole version of the VAS 140 to check whether the versions are the same.

The above-mentioned whole version of the application means a version of a set of APIs used by the application for the VAS 140. The whole version of the VAS 140 means a version of a set of all APIs of the VAS 140.

In addition, the VAS 140 has a function to check versions of APIs used by the application API by API. By having this function, even though the whole versions are different between the application and the VAS 140, there is a case where the VAS 140 determines that the application can be executed without problems as to version difference, since there is a case where an API that has been upgraded in the VAS side is not used in the application, for example.

The platform 120 includes control services for interpreting a process request from an application to issue an acquiring request for the hardware resources, a system resource manager (SRM) 123 for managing one or more hardware resources and arbitrating the acquiring requests from the control service, and a general-purpose OS 121.

The control services include a plurality of service modules, which are a system control service (SCS) 122, an engine control service (ECS) 124, a memory control service (MCS) 125, an operation panel control service (OCS) 126, a fax control service (FCS) 127, and a network control service (NCS) 128. In addition, the platform 120 has application program interfaces (API) that can receive process requests from the applications 130 by using predetermined functions. In this specification, in addition to the functions, an event that is sent from the application to the platform 120 and an event that is sent from the platform 120 to the application are also called "API".

The general purpose OS 121 is a general purpose operating system such as UNIX, and can execute each piece of software of the platform 120 and the applications 130 concurrently as a process.

The process of the SRM 123 is for performing control of the system and performing management of resources with the SCS 122. The process of the SRM 123 performs arbitration and execution control for requests from the upper layer that uses hardware resources including engines such as the scanner part and the printer part, a memory, a HDD file, a host I/Os (Centronics I/F, network I/F IEEE1394 I/F, RS232C I/F and the like).

More specifically, the SRM 123 determines whether the requested hardware resource is available (whether it is not used by another request), and, when the requested hardware resource is available, notifies the upper layer that the requested hardware resource is available. In addition, the SRM 123 performs scheduling for using hardware resources for the requests from the upper layer, and directly performs processes corresponding to the requests (for example, paper transfer and image forming by a printer engine, allocating memory area, file generation and the like).

The process of the SCS 122 performs application management, control of the operation part, display of system screen, LED display, resource management, and interrupt application control.

The process of the ECS 124 controls engines of hardware resources including the white and black laser printer (B&W LP) 101, the color laser printer (Color LP) 102, the scanner, and the facsimile and the like. The process of the MCS 125 obtains and releases an area of the image memory, uses the hard disk apparatus (HDD), and compresses and expands image data.

The process of the FCS 127 provides APIs for sending and receiving of facsimile from each application layer of the system controller by using PSTN/ISDN network, registering/referring of various kinds of facsimile data managed by BKM (backup SRAM), facsimile reading, facsimile receiving and printing, and mixed sending and receiving.

The NCS 128 is a process for providing services commonly used for applications that need network I/O. The NCS 128 distributes data received from the network by a protocol to a corresponding application, and acts as mediation between the application and the network when sending data to the network. More specifically, the process of the NCS 128 includes server daemon such as ftpd, httpd, lpd, snmpd, telnetd, smtpd, and client function of the protocols.

The process of the OCS 126 controls an operation panel that is a means for transferring information between the operator (user) and control parts of the machine. In the compound machine 100 of the embodiment, the OCS 126 includes an OCS process part and an OCS function library part. The OCS process part obtains an key event, which indicates that the key is pushed, from the operation panel, and sends a key event function corresponding to the key event to the SCS 122. The OCS function library registers drawing functions and other functions for controlling the operation panel, in which the drawing functions are used for outputting various images on the operation panel on the basis of a request from an application that has control right or from the control service. When the application is developed, functions in the OCS function library is linked to an object program that is generated by compiling a source code file of the application, so that an executable file of the application is generated. All of the OCS 126 can be configured as a process, or can be configured as an OCS library.

The application 130 includes a printer application 111 that is an application for a printer having page description language (PDL) and PCL and post script (PS), a copy application 112, a fax application 113 that is an application for facsimile, a scanner application 114 that is an application for a scanner, a network file application 115 and a process check application 116. When each of these application is launched, the application sends an application registering request message with a process ID of its process to the VAS 140. The VAS 140 that receives the application registering request message performs registration processing for the launched application.

Interprocess communication is performed between a process of the application 130 and a process of the control service, in which a function is called, a returned value is sent, and a message is sent and received. By using the interprocess communication, user services for image forming processes such as copying, printing, scanning, and sending facsimile are realized.

As mentioned above, the compound machine 100 of the first embodiment includes a plurality of applications 130 and a plurality of control services, and each of those operates as a process. In each process, one or more threads are generated and the threads are executed in parallel. The control services provide common services to the applications 130. User services on image formation such as copying, printing, scanning and sending facsimile are provided while the processes are executed in parallel, the threads are executed in parallel, and interprocess communication is performed. A third party vendor can develop applications 117, 118 for the compound machine 100, and can executes the application in an application layer on the control service layer in the compound machine 100. FIG. 1 shows an example including new applications 117 and 118.

In the compound machine 100 of the first embodiment, although processes of applications 130 and processes of control services operate, the application and the control service can be a single process. In addition, an application in the applications 130 can be added or deleted one by one.

Figure 2:
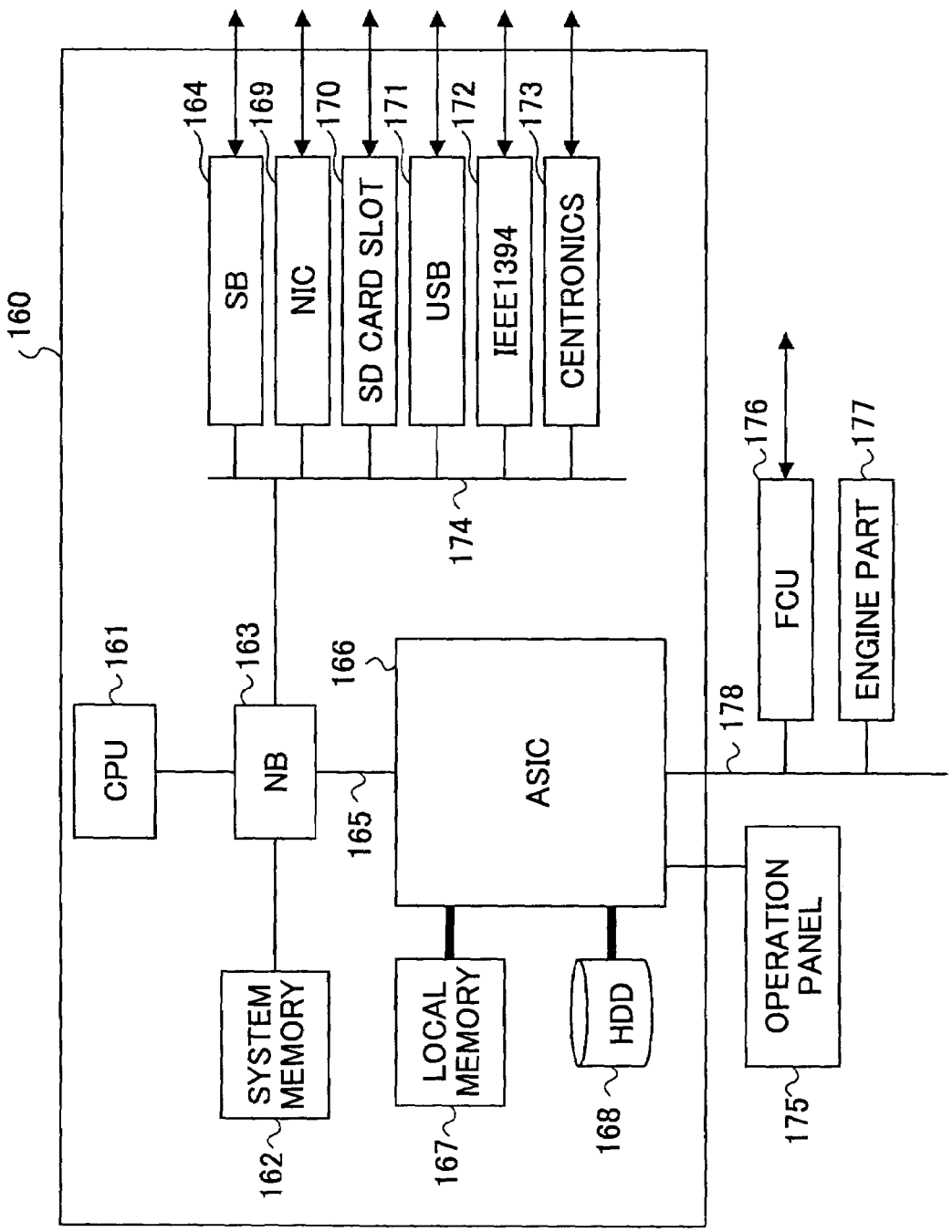
FIG. 2 shows an example of a hardware configuration of the compound machine 100.

FIG. 2 shows an example of a hardware configuration of the compound machine 100.

The compound machine includes a controller 160, an operation panel 175, a fax control unit (FCU) 176, and an engine part 177 that is hard ware resource such as a printer that is specific for image forming processing. The controller 160 includes CPU 161, a system memory 162, a north bridge (NB) 163, a south bridge (SB) 164, ASIC 166, a local memory 167, HDD 168, a network interface card (NIC) 169, a. SD card slot 170, a USB device 171, an IEEE1394 device 172, and a Centronics 173. The memories 162, 167 may includes RAMs and/or ROMs, for example. The FCU 176 and the engine part 177 are connected to the ASIC 166 in the controller via a PCI bus 178. The CPU 161 executes programs of the application and control services and the like installed in the compound machine 100 by reading from a RAM.

Figure 3:
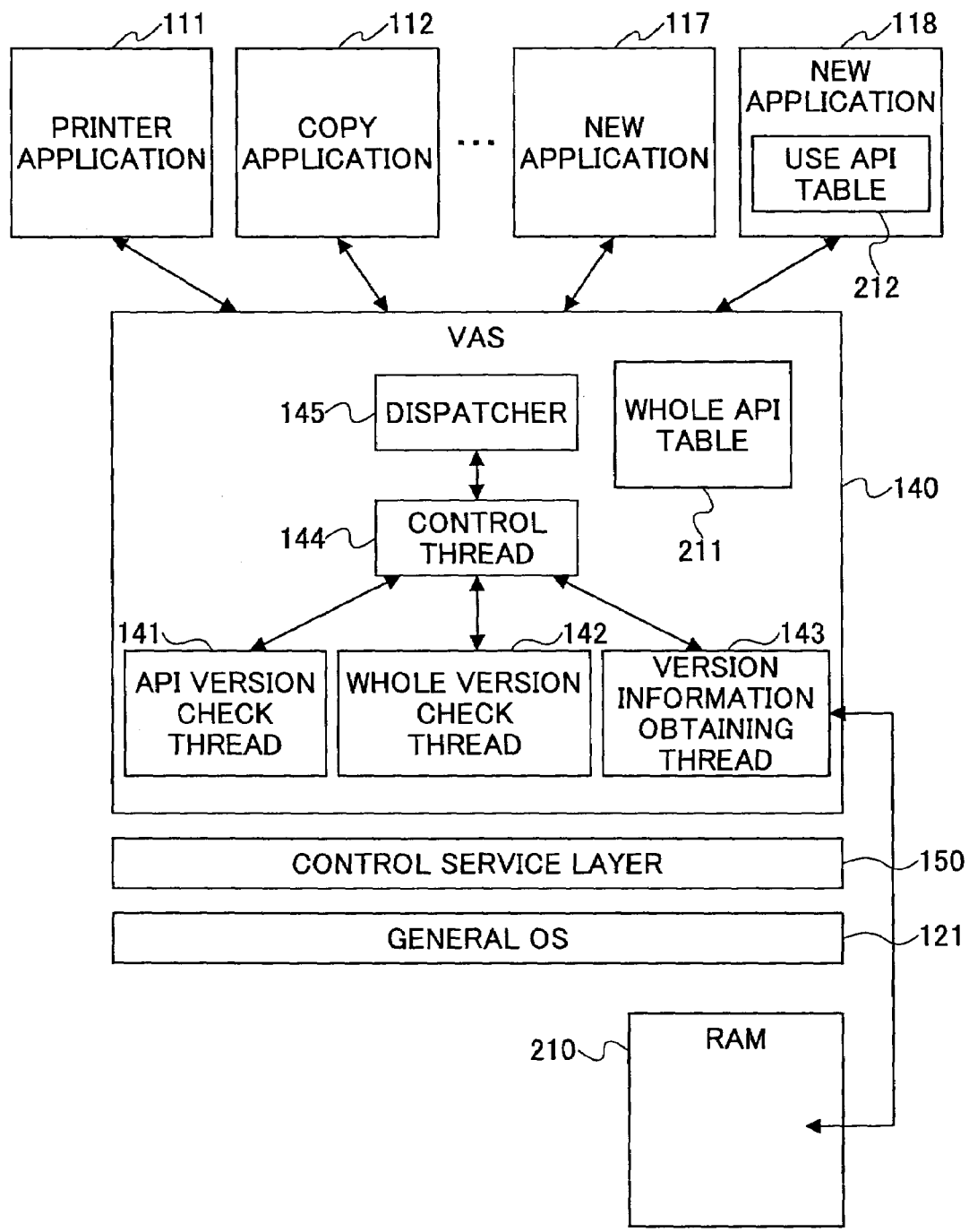
FIG. 3 shows a configuration of the VAS 140, and relationship among the VAS 140, each application, the control service layer 150 and the general OS 121 according to the first embodiment.

FIG. 3 shows a configuration of the VAS 140, and relationship among the VAS 140, each application, the control service layer 150 and the general OS 121 according to the first embodiment. In FIG. 3, the printer application 111, the copy application 112, the new applications 117 and 118 are shown as examples of the applications 130. Other applications may be included.

In the process of the virtual application service (VAS) 140, a dispatcher 145, a control thread 144, a version information obtaining thread 143, a whole version check thread 142, and an API version check thread 141 operate. The application includes a use API table 212, and the VAS 140 includes whole API table 211. More specifically, when application is executed (including tentative launch), and when the VAS 140 is executed, each of the use API table 212 and the whole API table 211 are located in the RAM 210 for example.

The dispatcher 145 monitors receiving message from the applications and the control services, and sends a process request to the control thread 144, the version information obtaining thread 143, the whole version check thread 142, or the API version check thread 141. In the compound machine 100 of the first embodiment, by using the dispatcher 145, interprocess communication can be performed between the VAS 140 and an application that is normally launched or tentatively launched. The "tentative launch" is to tentatively launch an application only for realizing communication between the application and the VAS 140. The tentative launch will be described later in more detail.

The control thread 144 sends version information for each API used by an application or whole version information of the application, sent via the dispatcher 144, to the version information obtaining thread 143, the whole version check thread 142, and the API version check thread 141. In addition, the control thread 144 controls processing order of the threads 141-143. In addition, the control thread 144 sends process requests from the threads 141-143 to the dispatcher 145.

The API version check thread 141 obtains version information of APIs used by an application for the VAS 140, and version information of all APIs of the VAS 140, and compares, API by API, versions of corresponding APIs between the application and the VAS to check whether the versions of the APIs are the same.

The whole version check thread 142 obtains whole version information of an application and whole version information of the VAS 140, and checks whether the whole version of the application and the whole version of the VAS are the same. By using this thread, first, the whole versions are compared, then, if the whole versions are the same, they are consistent with each other, and it is not necessary to compare versions API by API, so that the process can be simplified. The check of API by API is performed only when the whole versions are different.

The version information obtaining thread 143 obtains version information for each of APIs used by an application and functions of APIs of the VAS, in which the version information is necessary for the API version check thread 141. In addition, the version information obtaining thread 143 obtains the whole version information each for the application and the VAS necessary for the whole version check thread 142.

According to the present embodiment, version check is performed when an application is installed (more specifically, before the application is installed), thus, information can not be obtained by using interprocess communication between the application and the VAS 140 since the application is not launched. Thus, the VAS 140 tentatively launches an target application to obtain necessary information from the application by using interprocess communication. As to information obtained by the version information obtaining thread 143, in addition to the version information, the version information obtaining thread 143 may obtain product ID (determined uniquely from vendor, application, and version), vendor name, application name, whole version, resource information and the like.

Instead of providing the threads 141-144 as shown in FIG. 3, one thread can be provided. In this case, the one thread performs version check processes (obtain version information, perform version check) of the present embodiment. A program of the VAS 140 can be distributed by storing in a recording medium such as a SD card, a CD-ROM and the like. In addition, the program can be distributed via a network. In addition, the program can be installed in the compound machine by inserting the SD card in the compound machine. In addition, the program may be launched from the SD card.

Figure 4:
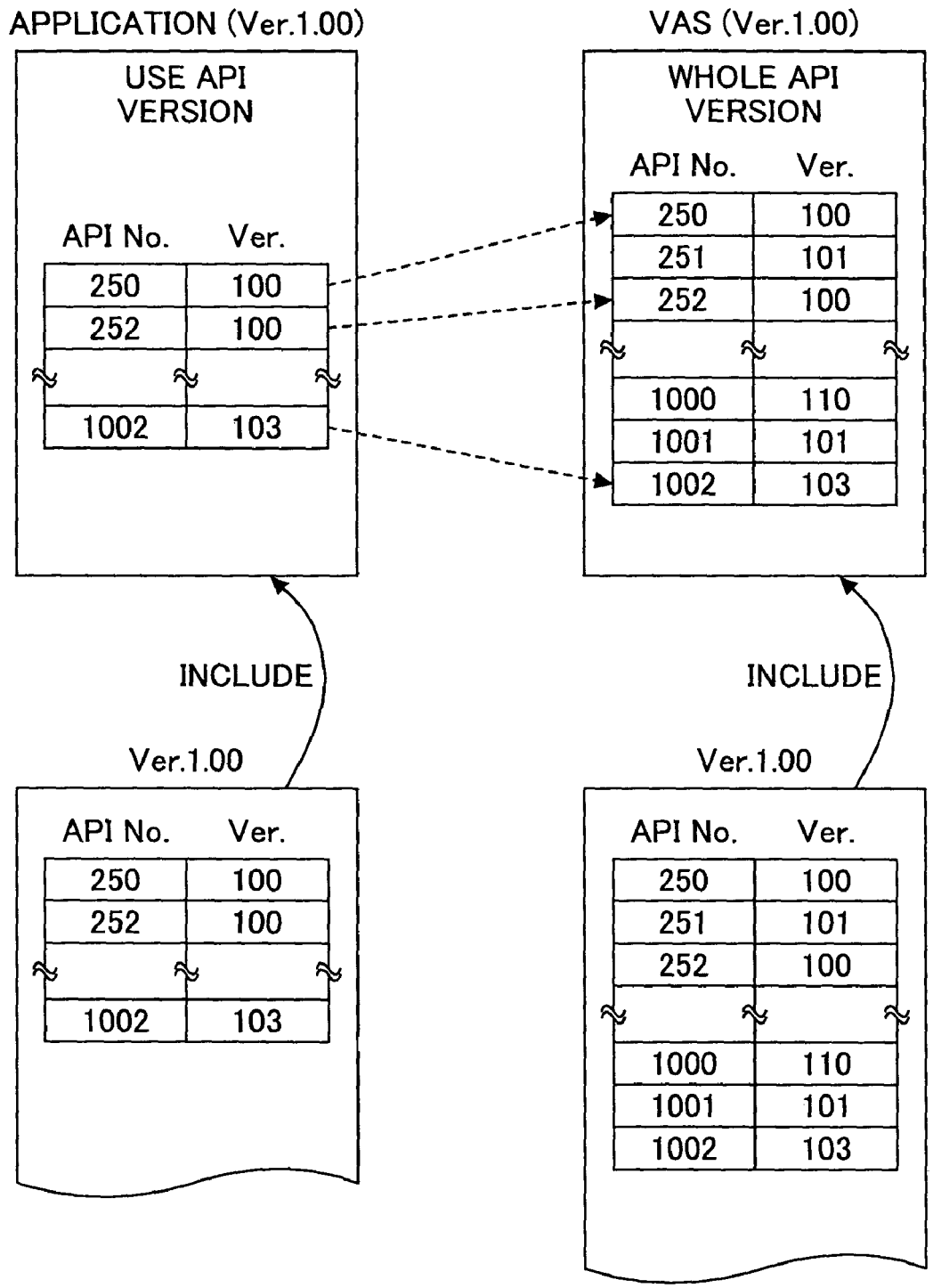
FIG. 4 is a figure for explaining the version check method for APIs between the application and the VAS 140 according to the first embodiment.

FIG. 4 is a figure for explaining the version check method for APIs between the application and the VAS 140. As shown in FIG. 4, version information (version table) of APIs used by the application for the VAS is included in the executive file of the application. In the same way, version information (version table) of APIs of the VAS is included in the executive file of the VAS. Generally, the APIs used by the application for the VAS are a part of the APIs of the VAS.

The version information of APIs of the VAS includes versions for each API and a version of a set of the APIs. The version information of APIs used by the application includes versions for each API and a version of a set of the APIs. The version of the set of APIs used by the application is the same as a version of the set of APIs of the VAS used when the application is developed.

In order to include the version information in the executive file, for example, as shown in FIG. 4, an include file of the version information is generated first, then, the application or VAS program is compiled by including the include file.

The VAS 140 obtains version information of APIs used by the application from the tentatively launched application by using interprocess communication. Then, the VAS 140 compares, API by API, the obtained version information and version information of APIs of the VAS to determined whether the application can be installed. In addition, the VAS 140 may compares versions of the sets of APIs between the application and the VAS 140, then, only if the versions are different, the VAS 140 may compare APIs API by API. The VAS 140 may perform the comparison after obtaining the whole table of the version information from the application, or may obtain the version of the APIs one by one to perform the comparison each time the VAS 140 obtains the version.

Instead of including the version information in the executive file, the version information may be stored in the compound machine 100 as a file. In this case, the VAS 140 obtains the version information by reading the file.

As long as the VAS 140 can refer to the version information, any method other than the above mentioned methods can be used to keep the version information in the compound machine 140.

Figure 5:
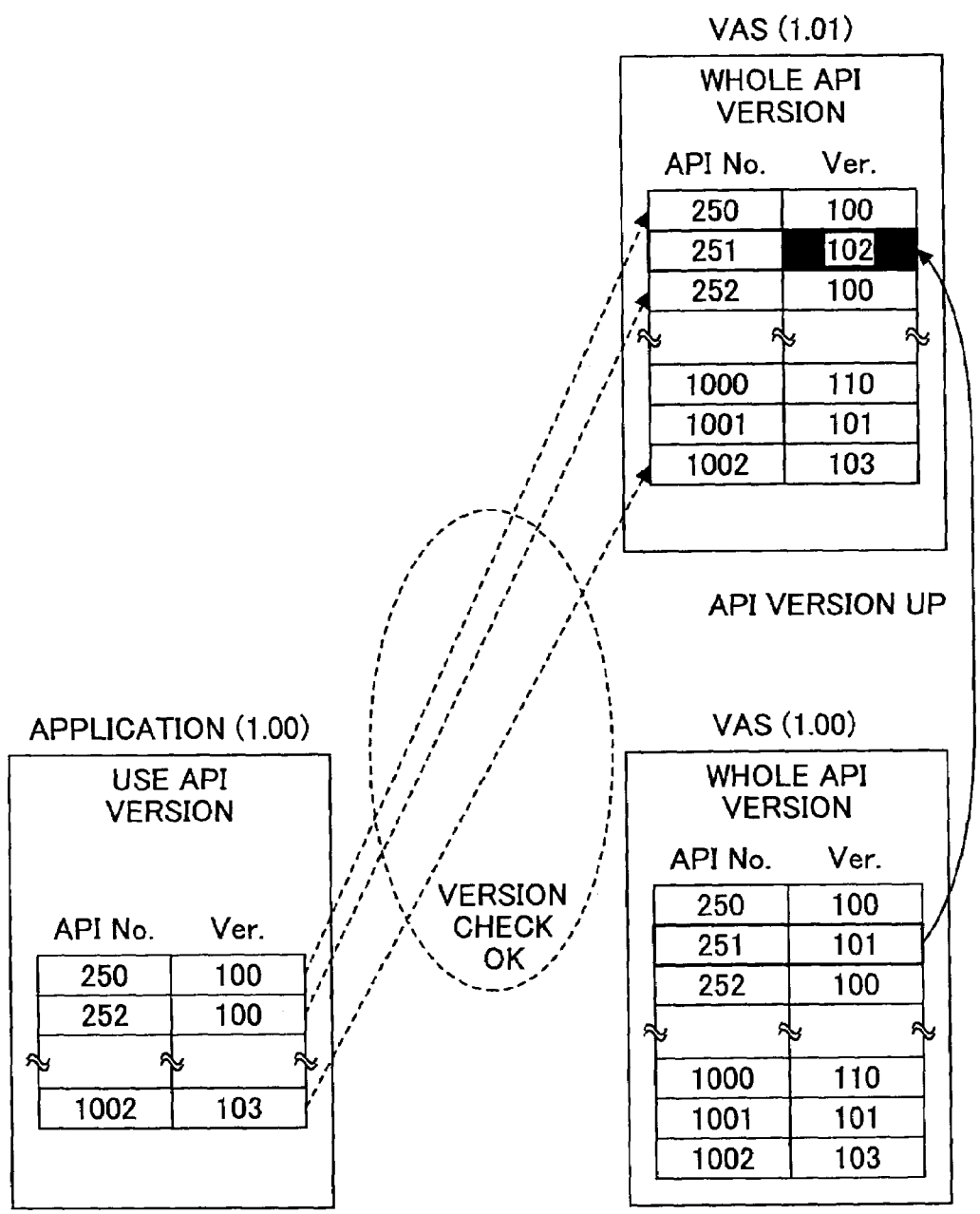
FIG. 5 is a figure for explaining the version check method for APIs between the application and the VAS 140 according to the first embodiment.

After the application is developed, the API set of the VAS 140 may be upgraded. In such a case, the version of the API set used by the application is different from the version of API set of the VAS 140. For example, in the example shown in FIG. 5, since an API (No.=251) is upgraded from a version 101 to a version 102, the version of the API set of the VAS is changed from 1.00 to 1.01.

In this case, if only the versions of API sets are compared, since the versions are different, the application and the VAS 140 are determined to be inconsistent with each other. However, since the API (No.=251) is not used in the application, the application can operate without problems. Therefore, by comparing versions API by API, there is a case where the VAS 140 can determine that the application can operate without problems even if the versions of API sets are different.

Next, the tentative launch of the application will be described. The tentative launch is different from normal launch of the application in which substantive resources of the compound machine is used (launch for causing functions intended by the application is called "normal launch"). In the tentative launch, the application does not obtain resources such as memory areas that are required when the application normally operates. In the tentative launch, the application only perform interprocess communication with the VAS 140, in which the application provides, to the VAS, information necessary for performing checks including version check on the application. The process of the tentatively launched application ends when communication between the application and the VAS ends. In addition, the function of the tentative launch of the application is independent of normal functions of the application, and is common to applications for the compound machines of the present embodiment. Therefore, for example, by providing a program template including the function of the tentative launch to a vendor, the vendor can easily develop an application for the compound machine by using the program template. For realizing the above-mentioned version check, for example, the vendor makes an include file in which versions of APIs used for developing the application are stored, and includes the include file when compiling the application program.

By providing the tentative launch function to the application, the application can provide application information to the VAS 140 without normal launch, so that the VAS 140 can check the application. Thus, even if the application is not consistent with the VAS 140 as for API version, the application can be prevented from malfunctioning and from affecting the compound machine.

FIG. 6 shows an example of a program description (main function) of an application including the tentative launch function. This description can be provided as the program template. As shown in FIG. 6, whether the application is tentatively launched or normally launched is determined by an argument (−v). Accordingly, one of normal launch and tentative launch can be easily selected when the VAS 140 launches the application. That is, when tentative launch is selected by using argument (−v), the application is tentatively launched so that application information is notified. If tentative launch is not selected, the application is normally launched so that intrinsic operation of the application can be performed.

When version check is performed at the time of application launch or at the time of execution of after the launch, the normal launch is used.

The program of the application including the tentative launch function can be distributed by using a recording medium such as SD card, CD-ROM and the like. In addition, the program can be distributed via a network. In addition, the program can be installed in the compound machine, for example, by inserting the SD card in the compound machine. In addition, the program can be launched from the SD card.

Figure 7:
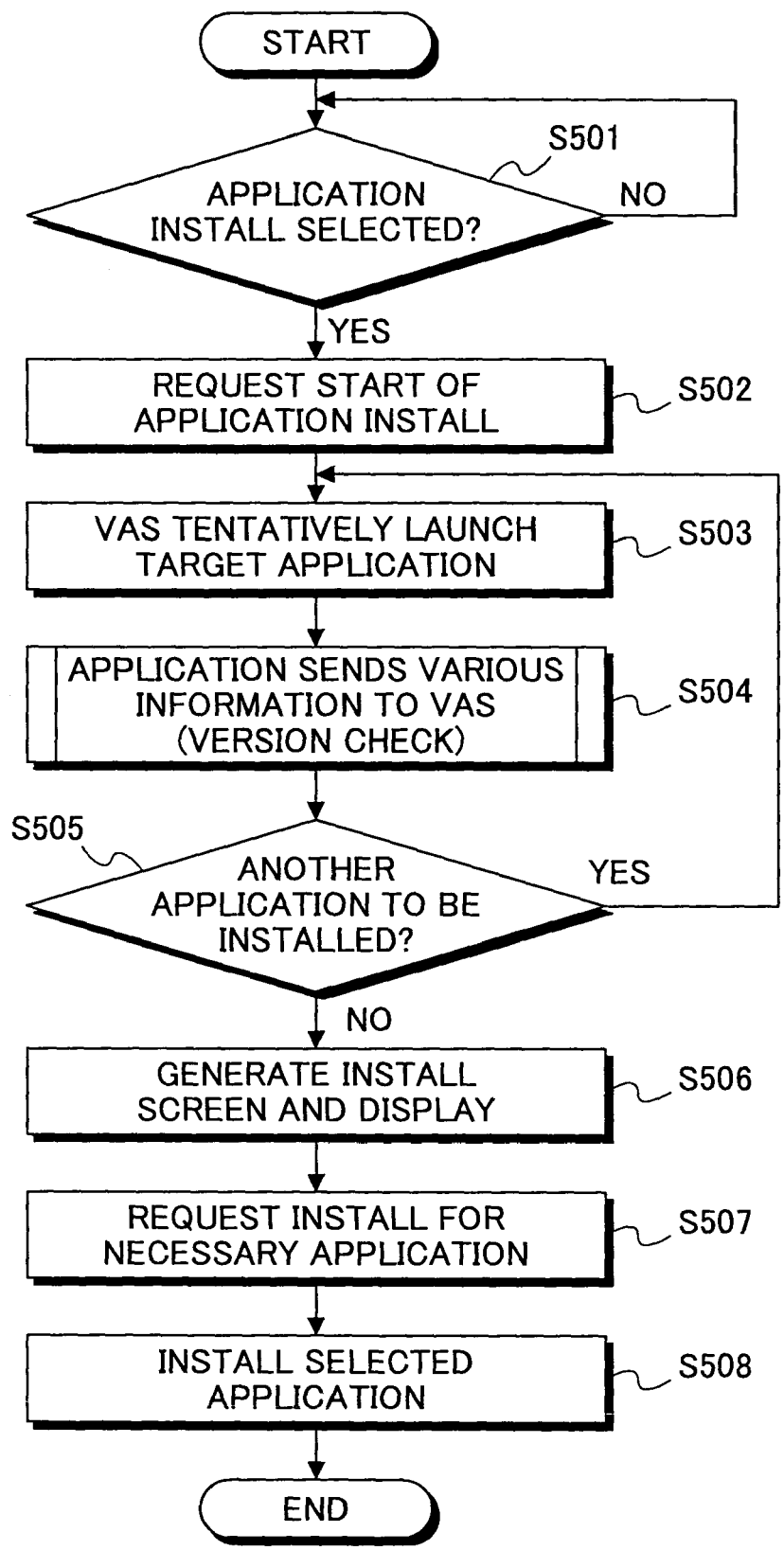
FIG. 7 is a flowchart for describing a sequence of tentative launch at the time of application install.
Figure 8:
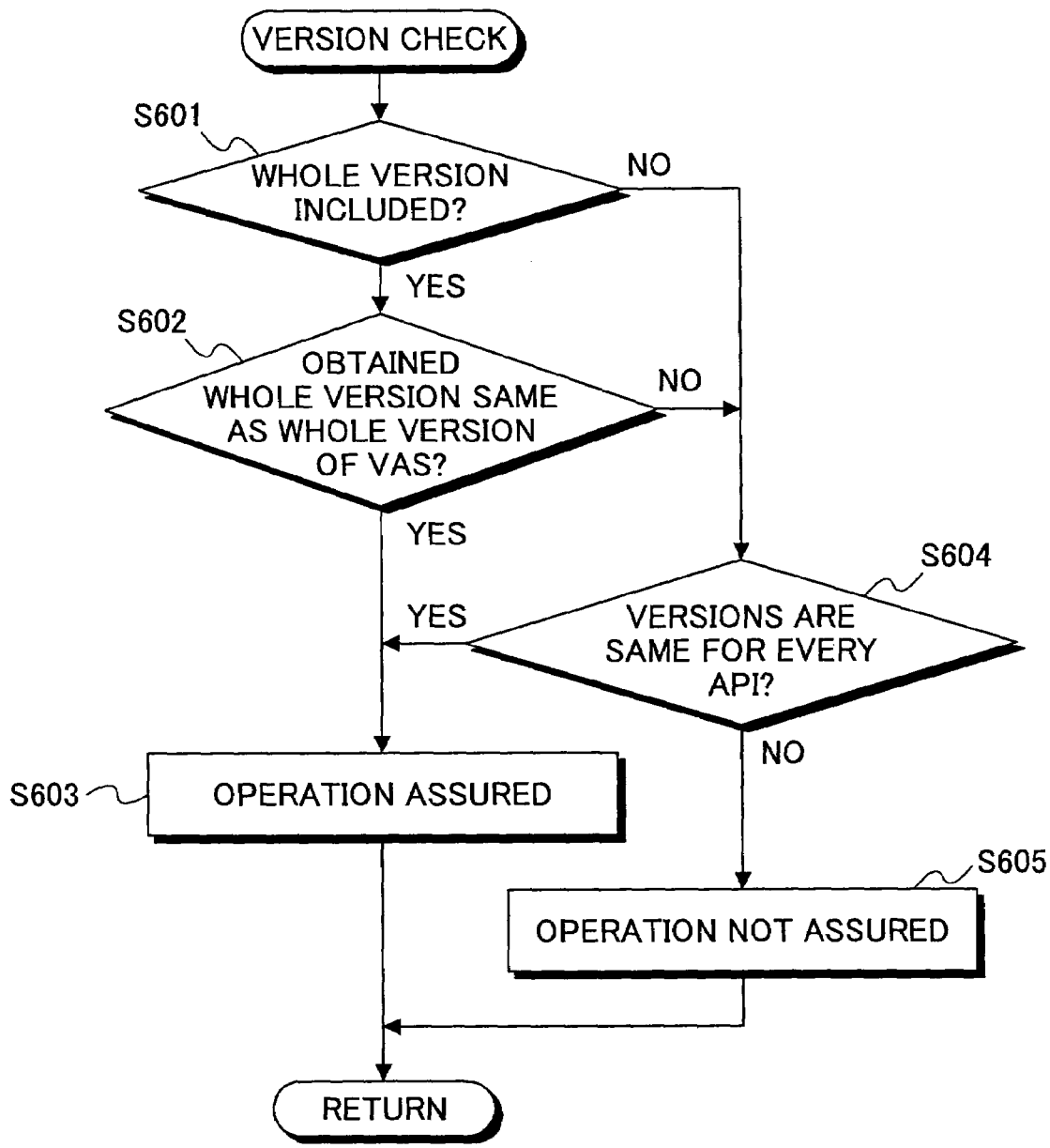
FIG. 8 is a flowchart showing a subroutine of the version check process in FIG. 7.

Next, the operation will be described. FIG. 7 is a flowchart for describing a sequence of tentative launch at the time of application install. FIG. 8 is a flowchart showing a subroutine of the version check process in FIG. 7.

First, as shown in FIG. 7, when a user selects install of an application by using a key or a button on the operation panel in step S501, the SCS 122 requests start of application install to the VAS 140 in step S502, the VAS 140 tentatively launches an application of install target in step S503. Then, the application sends various information to the VAS 140 by using interprocess communication, so that version check process is performed in step S504.

In the version check process in step S504, as shown in FIG. 8, the VAS 140 determined whether the whole version information of the application is included in the information notified from the application in step S601. When the whole version information is included, the whole version of the application is compared with the whole version of the VAS 140. If they are the same in step S602, the versions are consistent with each other so that the operation of the application is assured in step S603.

In addition, if NO in step S601 or S602 in FIG. 8, the process goes to step S604. Then, the VAS 140 checks, API by API, whether versions of APIs used by the application for the VAS 140 are the same as versions of corresponding APIs of the VAS 140. If they are the same for all APIs, the operation of the application is assured in step S603. If there is an API in which the versions are different, the operation of the application is not assured since the difference is out of range of support by the VAS 140 in step S605.

As mentioned above, after the version check process is performed in step S504 in FIG. 7, it is checked whether there is another application to be installed in step S505, and the above-mentioned version check process is repeated until there is no application to be installed.

If there is no application to be installed, an install screen is displayed on an operation panel on the basis of version check results of installed applications, so that various information is displayed in step S506. For example, if results whether the operation of the applications can be assured or not on the basis of the results of the version check, the user can easily select applications to be formally installed from the install screen in step S507. Then, the selected applications are finally installed in step S508.

As mentioned above, in the first embodiment, when the version check is performed at the time when the application is installed, the application is tentatively launched by using the VAS, so that the VAS obtains information including version information from the application by using interprocess communication. As a result, the versions can be checked, so that the user can selectively install applications whose operation is assured.

Instead of using tentative launch at the time of install, the version check can be performed when the application is normally launched. Whether the application is tentatively launched or normally launched is determined whether the argument (−v) is used or not in the main function. Since version information of the application can be obtained by using interprocess communication at the time of normal launch, the version check process can be performed. The version check at the time of application launch is effective for initially launching an application that has been already installed. In addition, if the compound machine is provided with a file including the version information of the application, the VAS can obtain the version information by referring to the file without interprocess communication.

Further, in the first embodiment, the version check can be also performed when the application is executed after the application is launched. At the time of execution, since the interprocess communication can be used, the version check can be performed, at a proper timing, in the same way as that at the time of normal launch.

As another method of version check at the time of execution of the application, following method can be used, for example. Version information is included in arguments of each API in the application, so that the application notifies the VAS 140 of the version information when the application uses the API. Then, the VAS 140 can check the version of the API by comparing with the version of corresponding API in the VAS 140. If the VAS 140 determines that the versions are different, the VAS does not send the request to a control service layer. In addition, the VAS 140 stops the execution of the application, displays an error on the operation panel so that the user knows the error. If there is no version difference, execution of the application continues.

The version check can be also performed in the application side instead of the VAS. In this case, the application obtains API version information from the VAS 140 and performs version check by using the version information. When the version check is performed at the time of install of the application, whether the versions are the same are sent to the VAS 140. When the version check is performed at the time of launch or execution of the application, if there is no version difference, launch or execution continues. If there is version difference, information indicating that there is the version difference is displayed on the operation panel, and the execution of the application ends.

As mentioned above, according to the compound machine of the first embodiment, the VAS 140 obtains version information of APIs used by the application and version information of APIs provided by the VAS 140, so that the VAS 140 checks, API by API, whether versions of corresponding APIs are the same. Therefore, if an API that is not used in the application is changed, added or deleted so that a version of the set of the APIs of the VAS 140 is changed, the VAS 140 can determine that the application and the VAS 140 are consistent with each other as for the versions of APIs. Comparing with the case of simply comparing the set of the APIs (whole version), absorbing range of version difference of the VAS is broaden and applications that can be used increases.

In addition, according to the compound machine of the first embodiment, the VAS 140 compares whole versions first, and then, the VAS 140 can perform version check API by API only when the whole versions are different. Therefore, the version check can be performed efficiently and quickly. In addition, by using an execution file of the application including necessary version information, the VAS 140 can obtain necessary version information by using interprocess communication performed when the application is tentatively launched or normally launched.

In addition, when the version check is performed at the time when the application is installed, the VAS 140 can tentatively launch the application, so that the VAS 140 can obtain version information of APIs used by the application. Therefore, version check can be performed more efficiently comparing with the case where version check is performed by normally launching the application.

Second Embodiment

Next, the second embodiment will be described. In the first embodiment that has been described so far, as shown in FIG. 4, the application includes version information of APIs used by the application for the VAS, and the VAS checks the version information.

Instead of providing a VAS such that it covers all control services as shown in FIG. 1, the VAS of the compound machine can be configured such that it covers a part of control services. In the second embodiment, the compound machine is configured to be able to check versions of APIs for control services that directly communicate with the application without intervened by the VAS. In the following description, each of the VAS and the control services are called "a system".

Figures 9, 10:
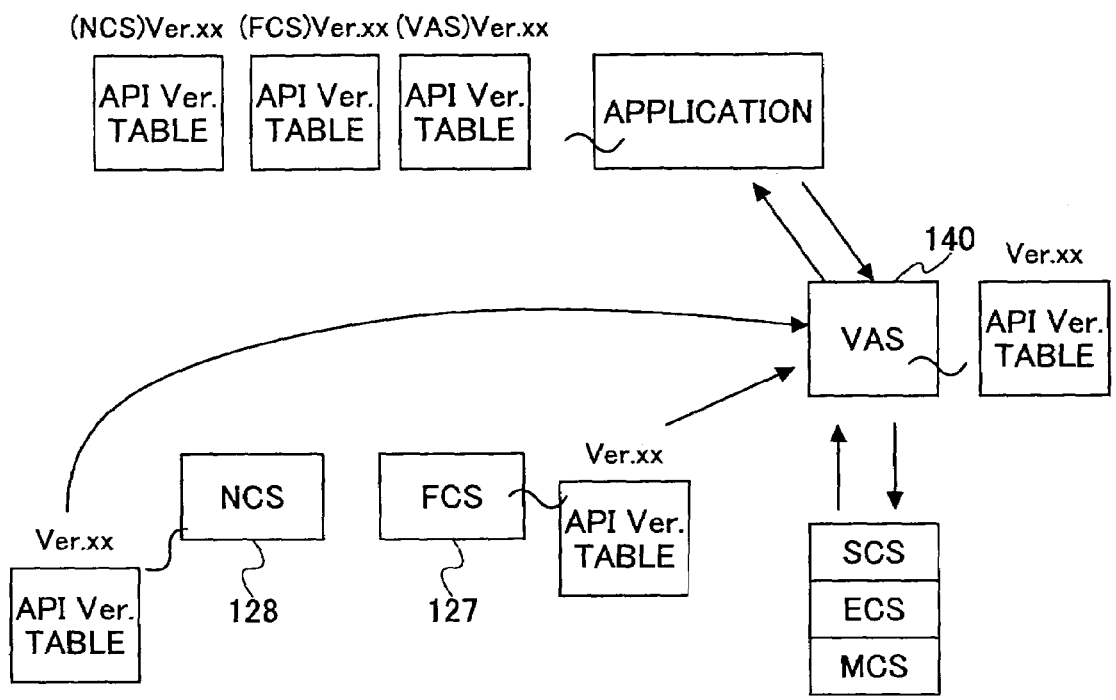
FIG. 9 is a figure for explaining version check method according to the second embodiment.
FIG. 10 is an example of a table included in the application.

In the second embodiment, as shown in FIG. 9, in addition to version information used for the VAS 140, the application includes version information of APIs used for control services for each control service. The VAS 140 obtains the version information from the application, and obtains version information of APIs of a corresponding system from the system, and compares the versions.

As shown in FIG. 9, the application includes tables of version information for each system as shown in FIG. 9. Instead of this configuration, the application may include a table including version information for all systems used by the application. In this case, each system can be identified in the table. In the case of FIG. 9, each table includes a version of the set of APIs as well as the versions of each API. The application may have a table including versions of sets of APIs for each system as shown in FIG. 10.

The version information such as those shown in FIG. 9 is included in the executive file of the application. Instead of this, the version information can be stored in one or more files in the compound machine. In such a case, the VAS obtains the version information by opening the file instead of using interprocess communication. For providing version information, other methods can be adopted as long as the VAS 140 can refer to the version information.

Figure 11:
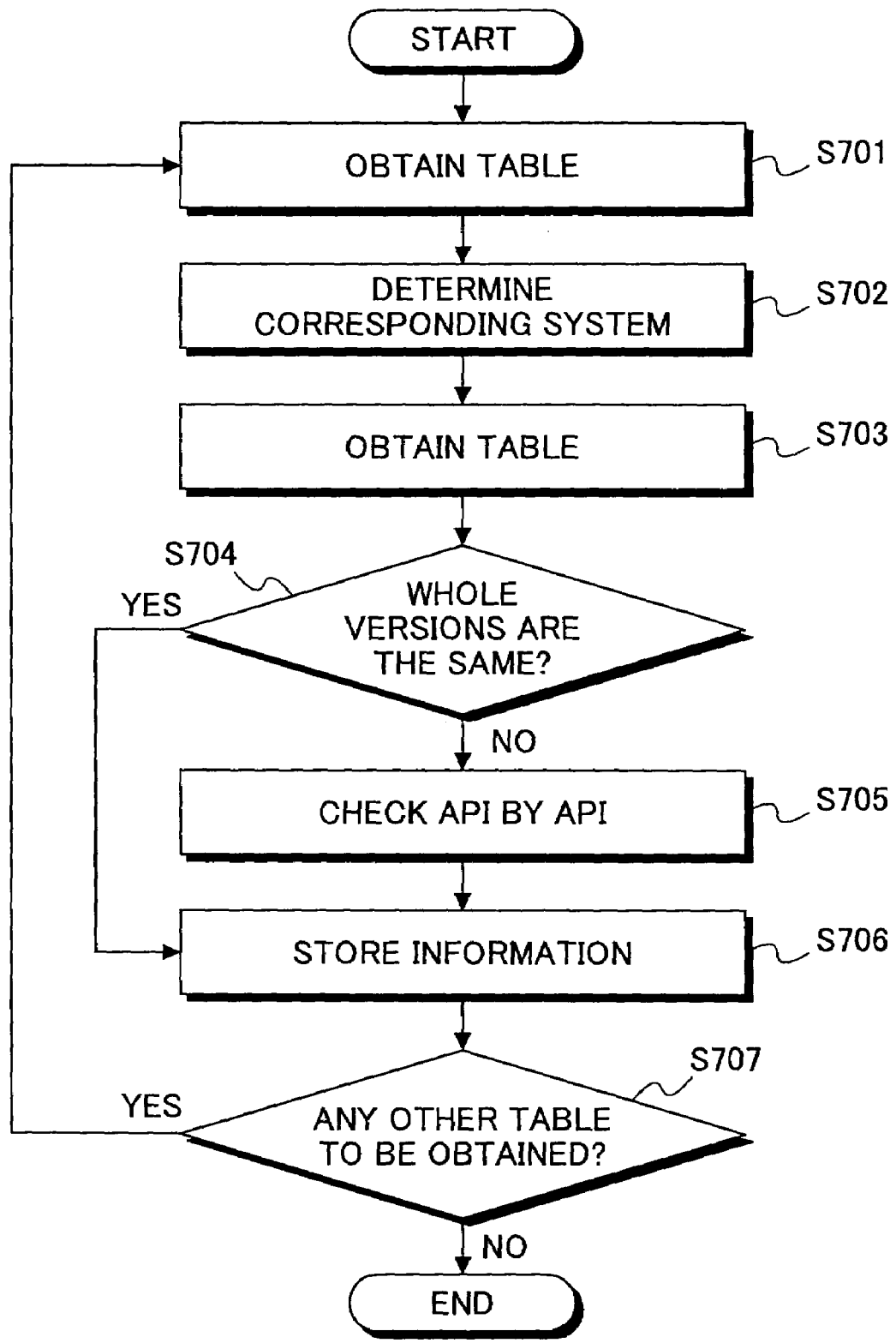
FIG. 11 shows a flowchart of version check performed by the VAS 140 in the configuration shown in FIG. 9.

FIG. 11 shows a flowchart of version check performed by the VAS 140 in the configuration shown in FIG. 9. The flow of FIG. 11 assumes that the VAS 140 obtains the table of the version information one by one from the application. In addition, the flowchart shows version check procedure at the time of install of the application.

First, the VAS 140 obtains a table from the application in step S701. Then, the VAS 140 determines which system the table corresponds to in step S702. Next, the VAS 140 obtains a table of version information of the corresponding system from the system in step S703.

Next, the VAS 140 compares the version information obtained from the application and the version information obtained from the system, so as to determining whether whole versions (version of API set) are the same or not in step S704. If they are the same, the VAS 140 stores information indicating versions are the same between the application and the system in step S706. Then, if there is no table to be obtained from the application in step S707, the version check ends. If there is another table, processes from step S701 are repeated.

If the versions are not the same in step S704, the VAS 140 checks, API by API, versions of the APIs used by the application for the system comparing with versions of corresponding APIs of the system in step S705. If all of the versions of the APIs used by the application are the same as the corresponding versions of the system, the VAS 140 stores information indicating that the versions are the same in step S706. If there is at least an API in which the versions are different between the application and the system, the VAS 140 stores information indicating that the versions are different in step S706. At this time, system name and API No. in which versions are different may be stored. Then, if there is no table to be obtained from the application in step S707, the version check ends. If there is another table in step S707, processes from step S701 are repeated.

For example, after the version check process ends, the VAS 140 displays on the operation panel information indicating that the application can be installed if versions are the same for all systems. On the other hand, the VAS 140 displays on the operation panel information indicating that the application can not be installed if there is at least a version-mismatched system. In this case, the VAS 140 may display the system name and version-mismatched API No. in the system.

According to this embodiment, not only APIs for the VAS 140 but also APIs for control services that directly communicate with the application can be checked.

Third Embodiment

The compound machine 100 of the first embodiment includes one VAS for all applications. According to the compound machine of the third embodiment, a plurality of VASes are launched for each application in which each VAS performs version check process for a corresponding application.

Figure 12:
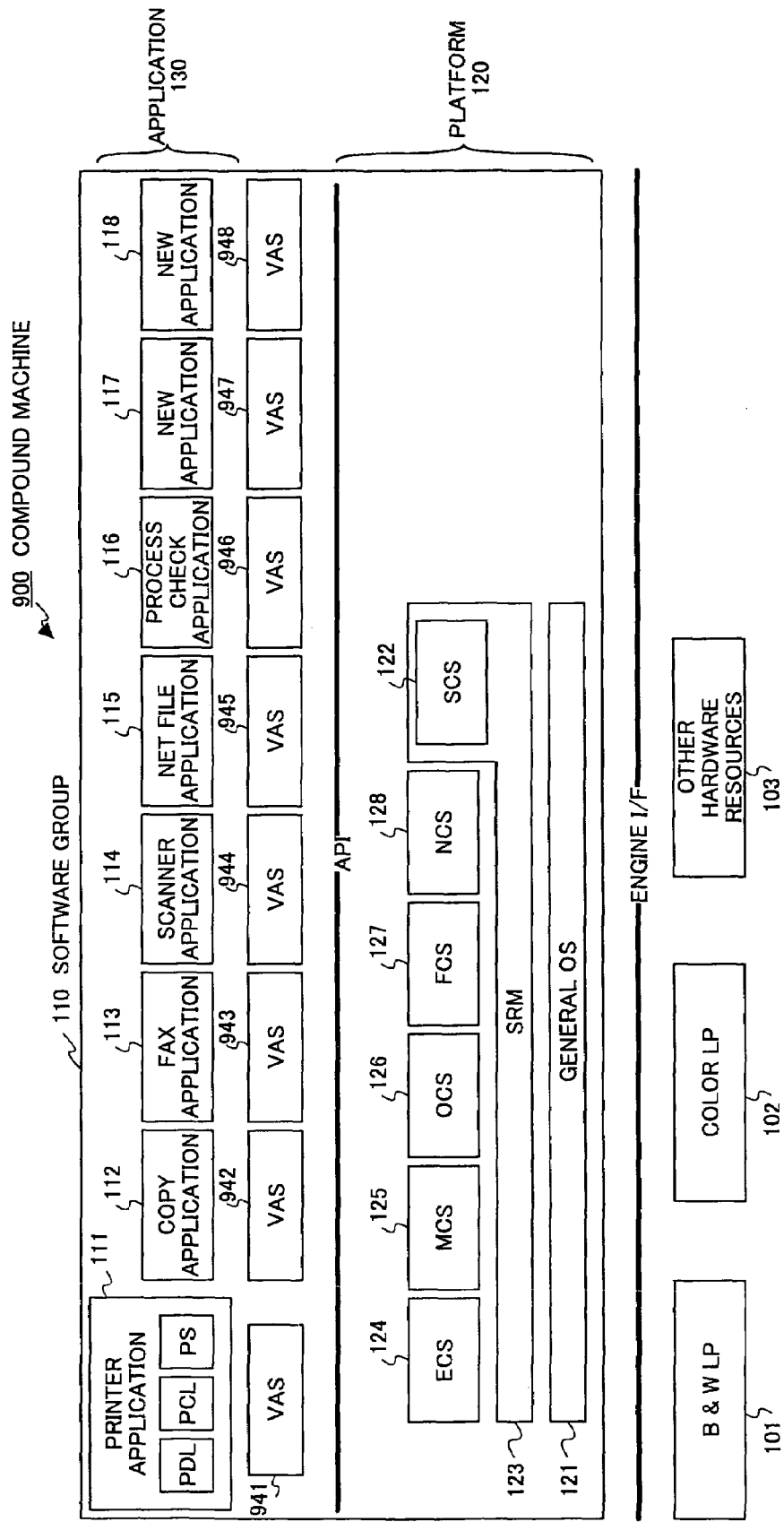
FIG. 12 is a block diagram of the compound machine of the third embodiment.

FIG. 12 is a block diagram of the compound machine of the third embodiment. As shown in FIG. 12, the compound machine 900 is different from the compound machine of the first embodiment in that a plurality of virtual application services operate for each application.

The VASes 941-948 performs version check for the printer application 111, copy application 112, fax application 113, the scanner application 114, the net file application 115 and the process check application 116 and the new applications 117 and 118.

FIG. 13 is a figure showing a configuration of the VAS 941-948 of the compound machine 900 of the second embodiment, and relationship among the VAS 941-948, each application, control service layer 150 and general OS 121. Although FIG. 13 shows the printer application 111, the copy application 112, the new applications 117 and 118 as the applications, and corresponding VASes 941, 942, 947 and 948 as an example, same configuration can be adopted for other applications.

According to the compound machine 900 of the second embodiment, different from the compound machine 100 of the first embodiment, as shown in FIG. 13, a VAS control daemon 901 operates between the VASes and an application. The VAS control process 901 has version information of APIs of the VASes.

Each process of the virtual application service (VAS) includes the dispatcher 145, the function version check thread 141, and the whole version check thread 142 and the version information obtaining thread 143.

The function of each thread of the compound machine is the same as that of corresponding thread of the first embodiment. Instead of using the threads 141-143, one thread can be used.

As the configuration of the VAS, configurations shown in FIGS. 14A-14C can be also adopted. FIG. 14A shows a case in which child processes of a parent VAS is used for each application, in which the parent VAS does not have screen control right (does not have user interface). FIG. 14B shows a case in which the parent VAS has the screen control right. FIG. 14C shows a case in which the functions of VAS are provided by using threads for each application.

For example, in the case of FIG. 14C, at the time when the application is not normally launched, the threads corresponding to each application is not launched. When an application is installed, a VAS that does not corresponds to any application tentatively launches the application, and performs version check. After that, the threads corresponding to each application are launched when the applications are normally launched.

As mentioned above, the image forming apparatus is provided. The image forming apparatus includes an application for performing processes on image forming, and a system service for performing processes of a system side of the image forming apparatus on the basis of a request by using an API from the application. In addition, the image forming apparatus includes: an obtaining part for obtaining version information of APIs used by the application for the system service, and version information of APIs of the system service; and a comparing part for comparing, API by API, versions of the APIs used by the application with versions of the APIs of the system service.

According to the present invention, since the image forming apparatus can compare, API by API, version information of APIs used by the application and version information of APIs of the system service side such as the VAS so that whether versions of the corresponding APIs are the same can be checked, it becomes possible to determined whether the application can be properly used.

The image forming apparatus may further includes a part for comparing a version of a set of the APIs used by the application with a version of a set of APIs of the system service, wherein the image forming apparatus performs comparison by the comparing part only when the versions of the sets of the APIs are different.

According to the present invention, since the API by API version check is performed only when the versions of API sets are different, version check can be performed efficiently.

In the image forming apparatus, an executive program of the application includes the version information of the APIs used by the application, and the obtaining part obtains the version information of the APIs used by the application from the application.

According to this invention, since version information of the APIs is included in the executive program of the application, the version information can be obtained from the application.

The image forming apparatus may tentatively launch the application for obtaining the version information from the application. According to this invention, since the application does not keep resources of the image forming apparatus substantially, the version check can be performed efficiently. In addition, since the version check can be performed without normal launch, the application can be prevented from affecting the image forming apparatus.

In the image forming apparatus, the system service may include a plurality of system service modules, the application includes version information of APIs used by the application for each of the system service modules, when the obtaining part obtains version information of APIs corresponding to a system service module from the application, the obtaining part obtains version information of APIs of the system service module from the system service module.

According to this invention, the version check can be performed for system services that are used by the application.

The image forming apparatus may include a file storing the version information of the APIs used by the application, wherein the obtaining part obtains the version information of the APIs used by the application from the file.

According to this invention, by storing a file including version information of APIs, the version check can be perfomred.

In image forming apparatus, wherein, when the comparing part compares the versions before the application is installed, the image forming apparatus displays on an operation panel information indicating that the application can be installed if all versions of the APIs used by the application are the same as versions of corresponding APIs of the system service.

According to this invention, as a result of version check, one can check which application can be installed.

The image forming apparatus may includes:

control services for controlling hardware resources of the image forming apparatus, and a virtual application service that operates as a client process for at least a control service, and operates as a server process for the application, wherein the system service includes at least a control service that receives a request by using an API from the application, and the virtual application service. In this image forming apparatus, the virtual application service may include the obtaining part and the comparing part.

The present invention is not limited to the specifically disclosed embodiments, and variations and modifications may be made without departing from the scope of the present invention.

What is claimed is:

1. An image forming apparatus including a system service for performing processes of a system side of the image forming apparatus on the basis of a request by using an API from an application for performing processes on image forming, the image forming apparatus comprising:

an obtaining unit configured to obtain version information of a plurality of APIs used by the application for the system service, and version information of a plurality of APIs corresponding to the system service;

a comparing unit configured to compare, API by API, version information of the one of the plurality of the APIs used by the application with version information of the one of the plurality of the APIs of the system service;
a further comparing unit configured to compare a version of a set of the APIs used by the application with a version of a set of APIs of the system service; and
control services configured to control hardware resources of the image forming apparatus, and a virtual application service that operates as a client process for at least a control service, and operates as a server process for the application, wherein the image forming apparatus performs comparison by the comparing unit only when the versions of the sets of the APIs are different, and the system service includes at least a control service that receives a request by using an API from the application, and the virtual application service.

2. The image forming apparatus as claimed in claim 1, wherein, an executive program of the application includes the version information of the APIs used by the application, and the obtaining unit obtains the version information of the APIs used by the application from the application.

3. The image forming apparatus as claimed in claim 2, wherein the image forming apparatus tentatively launches the application for obtaining the version information from the application.

4. The image forming apparatus as claimed in claim 2, wherein the system service includes a plurality of system service modules, the application includes version information of APIs used by the application for each of the system service modules, when the obtaining unit obtains version information of APIs corresponding to a system service module from the application, the obtaining unit obtains version information of APIs of the system service module from the system service module.

5. The image forming apparatus as claimed in claim 1, further comprising:
a file stored in memory, including the version information of the APIs used by the application, wherein the obtaining unit obtains the version information of the APIs used by the application from the file.

6. The image forming apparatus as claimed in claim 1, wherein, when the comparing unit compares the versions before the application is installed, the image forming apparatus displays on an operation panel information indicating that the application can be installed if all versions of the APIs used by the application are the same as versions of corresponding APIs of the system service.

7. The image forming apparatus as claimed in claim 1, wherein the virtual application service includes the obtaining unit and the comparing unit.

8. An API version check method performed by an image forming apparatus including a system service for performing processes of a system side of the image forming apparatus on the basis of a request by using an API from an application for performing processes on image forming, the method comprising:
obtaining version information of APIs used by the application for the system service, and version information of APIs of the system service;
comparing, API by API, versions of the APIs used by the application with versions of the APIs of the system service;
comparing a version of a set of the APIs used by the application with a version of a set of APIs of the system service; and a plurality of control service units configured to control hardware resources of the image forming apparatus, and a virtual application service that operates as a client process for at least a control service, and operates as a server process for the application, wherein the image forming apparatus performs a comparison, API by API, only when the versions of the sets of the APIs are different, and the system service includes at least a control service that receives a request by using an API from the application, and the virtual application service.

9. The method as claimed in claim 8, wherein an executive program of the application includes the version information of the APIs used by the application, and wherein the version information of the APIs used by the application is obtained from the application.

10. The method as claimed in claim 9, wherein the image forming apparatus tentatively launches the application for obtaining the version information from the application.

11. The method as claimed in claim 9, wherein the system service includes a plurality of system service modules, the application includes version information of APIs used by the application for each of the system service modules, further comprising:
obtaining version information of APIs corresponding to a system service module from the application, and obtaining version information of APIs of the system service module from the system service module.

12. The method as claimed in claim 8, further comprising:
a file stored in memory, including the version information of the APIs used by the application, wherein the version information of the APIs used by the application is obtained from the file.

13. The method as claimed in claim 8, wherein, when the versions are compared before the application is installed, the image forming apparatus displays on an operation panel information indicating that the application can be installed if all versions of the APIs used by the application are the same as versions of corresponding APIs of the system service.

14. The method as claimed in claim 8, wherein the virtual application service performs the obtaining and the comparing.

15. A computer readable medium encoding a program containing instructions, which when executed causes an image forming apparatus to execute a version check process, wherein the image forming apparatus includes a system service for performing processes of a system side of the image forming apparatus on the basis of a request by using an API from an application for performing processes on image forming, comprising:
obtaining program code means for obtaining version information of APIs used by the application for the system service, and version information of APIs of the system service;
comparing program code means for comparing, API by API, versions of the APIs used by the application with versions of the APIs of the system service;
program code means for comparing a version of a set of the APIs used by the application with a version of a set of APIs of the system service; and
means for controlling hardware resources of the image forming apparatus, and a virtual application service that operates as a client process for at least a control service, and operates as a server process for the application, wherein the comparing program code means performs comparison, API by API, only when the versions of the sets of the APIs are different, the system service includes at least a control service that receives a request by using an API from the application, and the virtual application service, and the image forming apparatus includes an application for performing processes on image forming, and a system service for performing processes of a system side of the image forming apparatus on the basis of a request by using an API from the application.

16. The computer readable medium as claimed in claim 15, wherein an executive program of the application includes the version information of the APIs used by the application, and the obtaining program code means obtains the version information of the APIs used by the application from the application.

17. The computer readable medium as claimed in claim 15, wherein the image forming apparatus includes a file stored in memory, including the version information of the APIs used by the application, and the obtaining program code means obtains the version information of the APIs used by the application from the file.

18. The computer readable medium as claimed in claim 15, wherein, when the comparing program code means compares the versions before the application is installed, the computer program further includes program code means for causing the image forming apparatus to display on an operation panel information indicating that the application can be installed if all versions of the APIs used by the application are the same as versions of corresponding APIs of the system service.

* * * * *